Sept. 16, 1958  A. BRUEDER  2,852,708
ELECTROMAGNETIC BRAKE
Filed Oct. 30, 1953
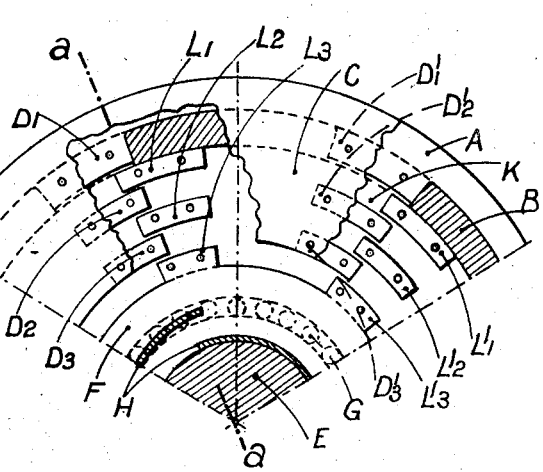
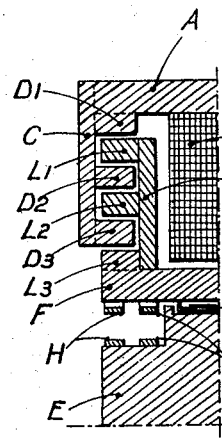
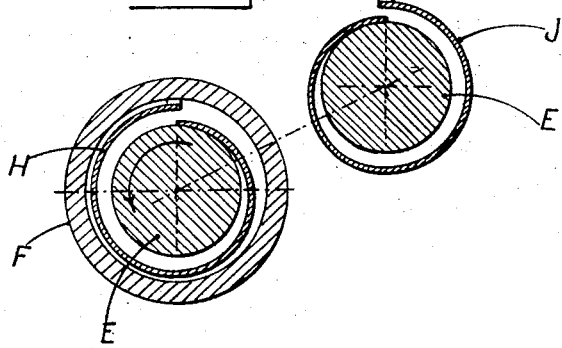
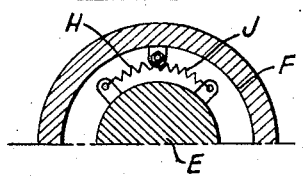
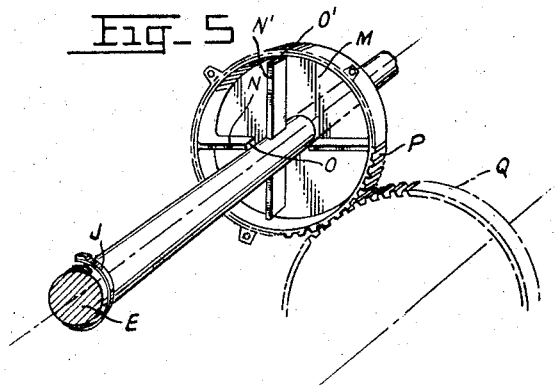

United States Patent Office 2,852,708
Patented Sept. 16, 1958

2,852,708

ELECTROMAGNETIC BRAKE

Antoine Brueder, Paris, France, assignor to Societe Anonyme Andre Citroen, Paris, France, a corporation of France Application October 30, 1953, Serial No. 389,340

Claims priority, application France November 6, 1952

6 Claims. (Cl. 310—93)

This invention relates to an electrically operated brake for effecting a braking action on a shaft, and has for its object to provide a simple, efficient and compact construction.

With the foregoing object in view an electrically operated brake made in accordance with the present invention comprises outer and inner members made of magnetic material mounted coaxially on the shaft to be braked, the outer member being fixed and the inner member being arranged for limited angular displacement relatively to the shaft, an energising winding accommodated within the fixed outer member, said inner and outer members each being connected by non-magnetic supporting members to a plurality of circumferentially extending and radially overlapping magnetic sector parts arranged coaxially with the shaft, the sector parts on one supporting member being capable of engaging between sector parts on the other supporting member and the number and distribution of these sector parts being such that when the said winding is energised to effect braking of the shaft the sector parts on one supporting member are attracted by those on the other supporting member and produce a number of retaining actions corresponding to the number of sector parts distributed around the supporting members.

The inner member may be connected to the shaft by two springs which act in opposite directions on the shaft.

A damping device may be provided to regulate the braking operation, and the device may include a multiplication gear arranged to increase the number of retaining actions during each revolution of the shaft.

One embodiment of an electrically operated braking device made in accordance with the invention is illustrated diagrammatically in the accompanying drawings, in which:

Fig. 1 is a view of a part of one form of device made in accordance with the invention;

Fig. 2 is a half-section taken on the line a—a of Fig. 1;

Fig. 3 illustrates a method of mounting springs between a hub on the shaft, and a member surrounding the hub;

Fig. 4 illustrates a modified method of mounting the springs shown in Fig. 3.

Fig. 5 is a perspective view of the present invention illustrating the use of a damping device therewith.

The brake device shown in the drawings comprises an outer cylindrical member A made of magnetic material inside which is accommodated an energising winding B. On each side of the member A is fixed a ring C made of non-magnetic metal, and on these rings are riveted sector parts of magnetic rings $D_1$, $D_2$, $D_3$, $D'_1$, $D'_2$, $D'_3$. A suitable number of these sector parts is provided around the rings C concentrically with the axis of the hub or of the shaft E.

Around the hub E is disposed an inner cylindrical member F which can turn on the hub to a limited extent whilst remaining centred by means of a ball, roller or other bearing G. The angular displacement of the member F is limited by two springs H and J which act respectively in opposite directions. In the embodiment shown in Fig. 3, these springs are leaf springs wound in opposite directions on the hub E, their ends being fixed respectively on the member F and on the hub E. In the embodiment shown in Fig. 4, the connection between the member F and the hub is effected by coiled springs also denoted H, J respectively. The member F is thus balanced angularly by the two springs H, J.

On each side of the member F are fixed two nonmagnetic rings K on which are riveted sector parts $L_1$, $L_2$, $L_3$, $L'_1$, $L'_2$, $L'_3$ of a magnetic ring. These parts are concentric with the axis of the hub and a suitable number is provided around the circumference.

The sector parts $L_1$, $L_2$, $L_3$ engage in the spaces between the corresponding parts $D_1$, $D_2$, $D_3$ of the outer member A, leaving a small gap which is sufficient to allow relative rotation between the member A and parts $D_1$, $D_2$, $D_3$ and the member F and parts $L_1$, $L_2$, $L_3$ without frictional engagement. The extent of angular rotation permitted in the two directions is limited by the design of the springs H and J.

The sector parts are designed so that they may either fit exactly between one another, or engage in the spaces between two other groups of sector parts such as $D_1$, $D_2$, $D_3$—$D'_1$, $D'_2$, $D'_3$, these spaces being wider than the sector parts.

In Fig. 5 there is shown a shock absorbing device M comprising a hollow fly-wheel filled with oil having radial inner blades N projecting from the periphery toward the center leaving a slight space or clearance O between them and the central shaft E. The shaft E is provided with blades N' having a slight clearance O' between them and the fly-wheel. Thus the shaft E drives the fly-wheel by means of the fluid therein, which cooperates with the blades so that oil or fluid therein absorbs the intermittent shocks caused by the intermittent and successive braking actions each time the sectors of part F pass over the sectors of part A. Finally a set of gear wheels may be provided between the driven shaft and the shaft E being braked. Accordingly the fly-wheel may be provided with teeth as shown so as to comprise a pinion P meshing with a toothed wheel or gear Q carried by the driven shaft (not shown).

The brake device above described operates as follows:

In order to apply the brake, electric current is supplied to the winding B, proportionally to the braking action to be effected. The winding B produces a closed magnetic circuit through the parts A, $D_1$, $L_1$, $D_2$, $L_2$, $D_3$, F (the path on the other side being identical) if the parts A and F are so arranged that the sector parts $D_1$, $D_2$ . . . $L_1$, $L_2$ . . . coincide.

If the member F is actuated by the hub E, through the action of one of the springs H or J (which depends on the direction of rotation), it tends to turn, i. e. the sector parts slide relatively to one another and the sector parts $L_1$, $L_2$, $L_3$ tend to occupy the spaces between the fixed sector parts $D_1$, $D_2$, $D_3$, $D'_1$, $D'_2$, $D'_3$, and since there is an attraction between the two groups of sector parts it is this retaining action which constitutes the braking action.

When the parts $L_1$, $L_2$, $L_3$ have passed the parts $D_1$, $D_2$, $D_3$ and approach the parts $D'_1$, $D'_2$, $D'_3$, they will be attracted by the latter, but this does not interfere with the braking action, by reason of the springs H and J.

When the parts $L_1$, $L_2$, $L_3$ are respectively disposed below the parts $D'_1$, $D'_2$, $D'_3$, the same operation again takes place.

Each time that the sector parts attached to the member F pass under the sector parts attached to the member A, there is a retaining action, i. e. if $n$ groups of sector parts are provided the retaining action is repeated $n$ times per revolution. This retaining or braking action is effected by magnetic forces rather than by frictional contact.

The action may be regulated by any known damping device, not shown in the drawings.

It will be obvious that the brake can act on the shaft to be braked through the intermediary of a gear train arranged to multiply the number of revolutions.

I claim:

1. An electromagnetic brake for effecting braking action on a shaft, comprising outer and inner members made of magnetic material mounted coaxially on the shaft to be braked, the outer member being fixed and the inner member being arranged for limited angular displacement relatively to the shaft, an energizing winding accommodated within the fixed outer member, cooperating non-magnetic supporting members carried by said outer and inner members respectively, a plurality of sectors of magnetic material fixed on each of said supporting members, said sectors being arranged on said supporting members in radially spaced circular rows concentric with said shaft and being spaced apart from one another circumferentially in said rows, circular rows of said sectors on one of said supporting members being interposed in radial spaces between circular rows of said sectors on the cooperating supporting member, said sectors being so arranged that when said winding is energized and said inner and outer members are turned so that sectors on one supporting member are approximately aligned in a radial direction with sectors on the cooperating supporting member, the aligned sectors provide magnetic paths for flux from said winding and resist movement out of alignment by relative rotation of said inner and outer members, thereby providing a braking effort.

2. A brake according to claim 1, wherein a damping device is provided to regulate the braking operation.

3. A brake according to claim 1, wherein the brake acts on the shaft through a multiplication gear in order to increase the number of retaining actions during each revolution of the shaft.

4. An electromagnetic brake for effecting braking action on a shaft, comprising outer and inner members made of magnetic material mounted coaxially on the shaft to be braked, the outer member being fixed and the inner member being arranged for limited angular displacement relatively to the shaft, an energizing winding accommodated within the fixed outer member, a pair of non-magnetic annular supporting discs projecting inwardly from said outer member on opposite sides of said winding, a pair of non-magnetic annular supporting discs projecting outwardly from said inner member and cooperating respectively with said discs on the outer member, said cooperating discs being spaced axially from one another, a plurality of sectors of magnetic material fixed on the facing sides of cooperating discs, said sectors being spaced circumferentially apart from one another in said rows, circular rows of said sectors on each of said discs being interposed between circular rows of said sectors on the cooperating disc, said sectors being so arranged that when said winding is energized and said inner and outer members are turned so that sectors on one disc are approximately aligned with sectors on the cooperating disc, the aligned sectors provide magnetic paths for flux from said winding and resist movement out of alignment by relative rotation of said inner and outer members, thereby providing a braking effort.

5. An electro-magnetic brake for effecting brake action on a shaft, comprising outer and inner members made of magnetic material mounted coaxially on the shaft to be braked, the outer member being fixed and the inner member being arranged for limited angular displacement relative to the shaft, two springs each being connected to the inner member and the shaft so as to act in opposite directions on the shaft, an energizing winding accommodated within the fixed outer member, cooperating non-magnetic supporting members carried by said outer and inner members respectively, a plurality of sectors of magnetic materials fixed on each of said supporting members, said sectors being arranged on said supporting members in radially spaced circular rows concentric with said shaft and being spaced apart from one another circumferentially in said rows, circular rows of said sectors on one said supporting members being interposed in radial spaces between circular rows of said sectors on the cooperating supporting member, said sectors being so arranged that when said winding is energized and said inner and outer members are turned so that sectors on one supporting member are approximately aligned in a radial direction with sectors on the cooperating supporting member, the aligned sectors provide magnetic paths for flux from said winding and resist movement out of alignment by relative rotation of said inner and outer members, thereby providing a braking effort.

6. An electro-magnetic brake for effecting brake action on a shaft, comprising outer and inner members made of magnetic material mounted coaxially on the shaft to be braked, the outer member being fixed and the inner member being arranged for limited angular displacement relative to the shaft, flexible means connected to the inner member and the shaft so as to act in opposite directions on the shaft, an energizing winding accommodated within the fixed outer member, cooperating non-magnetic supporting members carried by said outer and inner members respectively, a plurality of sectors of magnetic materials fixed on each of said supporting members, said sectors being arranged on said supporting members in radially spaced circular rows concentric with said shaft and being spaced apart from one another circumferentially in said rows, circular rows of said sectors on one said supporting members being interposed in radial spaces between circular rows of said sectors on the cooperating supporting member, said sectors being so arranged that when said winding is energized and said inner and outer members are turned so that sectors on one supporting member are approximately aligned in a radial direction with sectors on the cooperating supporting member, the aligned sectors provide magnetic paths for flux from said winding and resist movement out of alignment by relative rotation of said inner and outer members, thereby providing a braking effort.

References Cited in the file of this patent

UNITED STATES PATENTS

| | | |
|---|---|---|
| 299,013 | Robb et al. | May 20, 1884 |
| 1,123,404 | Sears | Jan. 5, 1915 |
| 1,697,292 | Sperry | Jan. 1, 1929 |
| 2,029,862 | Dodge | Feb. 4, 1936 |
| 2,220,163 | List | Nov. 5, 1940 |
| 2,348,175 | Cripps | May 2, 1944 |